United States Patent [19]
Huang

[11] Patent Number: 5,636,853
[45] Date of Patent: Jun. 10, 1997

[54] BABY ROCKING CARRIAGE

[76] Inventor: Li-chu C. Huang, No. 9, Alley 2, Lane 606, Sec. 2, Po-ai Rd., Chiayi City, Taiwan

[21] Appl. No.: 572,246

[22] Filed: Dec. 13, 1995

[51] Int. Cl.⁶ .................................................. B62B 9/22
[52] U.S. Cl. ...................... 280/30; 280/11; 280/43.24; 280/87.01; 280/47.34; 297/131; 472/102
[58] Field of Search ........................ 297/131; 472/102; 280/7.12, 8, 9, 11, 30, 43, 43.24, 658, 87.01, 47.34, 47.38

[56] References Cited

U.S. PATENT DOCUMENTS

| | | | |
|---|---|---|---|
| 1,468,682 | 9/1923 | Wallace | 280/11 |
| 2,461,609 | 2/1949 | Light | 280/11 X |
| 2,541,327 | 2/1951 | Billinghurst | 280/9 X |
| 2,716,439 | 8/1955 | Feist | 280/9 X |
| 3,944,241 | 3/1976 | Epelbaum | 280/30 |
| 4,265,461 | 5/1981 | Okubo | 280/11 X |
| 4,722,537 | 2/1988 | Chau-Pin | 280/9 X |
| 5,203,581 | 4/1993 | Jankowski | 280/43.22 X |
| 5,373,708 | 12/1994 | Dumoulin, Jr. | 280/30 X |

*Primary Examiner*—Brian L. Johnson
*Assistant Examiner*—Michael Mar
*Attorney, Agent, or Firm*—Watson Cole Stevens Davis, P.L.L.C.

[57] ABSTRACT

A mechanism is provided for extending and retracting wheels on a baby rocking carriage which includes two parallel arcuate beams, four base members each fixedly mounted on one distal end of each of the arcuate beams and having a passage and a cavity each defined in an underside thereof, four wheel modules each pivotally disposed on an underside of a respective one of the four base members. The mechanism includes a sleeve rotatably mounted in the passage of each of the base members and having an extension pivotally engaged with each of the wheel modules. A control member has a plug fixedly mounted in a chamber defined in the sleeve to rotate therewith and has a lug extending outwards of the sleeve. A catch member is pivotally mounted in an opening defined in the lug and has a first end portion and a second end portion having a boss detachably received in the cavity of each of the base members. A biasing member is mounted between the first end portion of the catch member and the lug.

3 Claims, 7 Drawing Sheets

5,636,853

BABY ROCKING CARRIAGE

FIELD OF THE INVENTION

The present invention relates to a baby rocking carriage, and more particularly to a mechanism for folding and expanding wheel modules of a baby rocking carriage.

BACKGROUND OF THE INVENTION

A conventional baby carriage is shown in FIG. 9, however, there still remain shortcomings therein.

There will be a complete illustration in the detailed description of the preferred embodiments, concerning the conventional baby carriage.

The present invention has arisen to mitigate and/or obviate disadvantages of the conventional baby carriage.

SUMMARY OF THE INVENTION

In accordance with one aspect of the present invention, there is provided a mechanism for folding and expanding wheel modules of a baby rocking carriage.

The baby rocking carriage includes two arcuate beams arranged in parallel with each other and each having two distal ends, four base members each having a first end portion fixedly mounted on a corresponding distal end of each of the two arcuate beams and a second end portion having a passage and a cavity each transversely defined in an underside thereof and located adjacent to each other, and four wheel modules each pivotally disposed on an underside of a corresponding one of the four base members.

The mechanism comprises a sleeve rotatably mounted in the passage of the second end portion of each of the four base members and having a chamber transversely defined therein. An extension protrudes from an underside of the sleeve and is pivotally engaged with each of the four wheel modules.

A control member includes a plug fixedly mounted in the chamber of the sleeve to rotate therewith and a lug formed on the plug and extending outwards of the sleeve, and an opening is transversely defined in the lug.

A catch member is pivotally mounted in the opening of the lug and includes a first end portion having a space transversely defined therein, a mediate portion, and a second end portion releasably rested against the second end portion of each of the four base members. A boss is laterally formed on and protrudes from the second end portion of the catch member and is detachably received in the cavity 148 of each of the four base members. A biasing member is mounted between the first end portion of the catch member and the lug of the control member and has one distal end received in the space.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENTS

Figure 9:
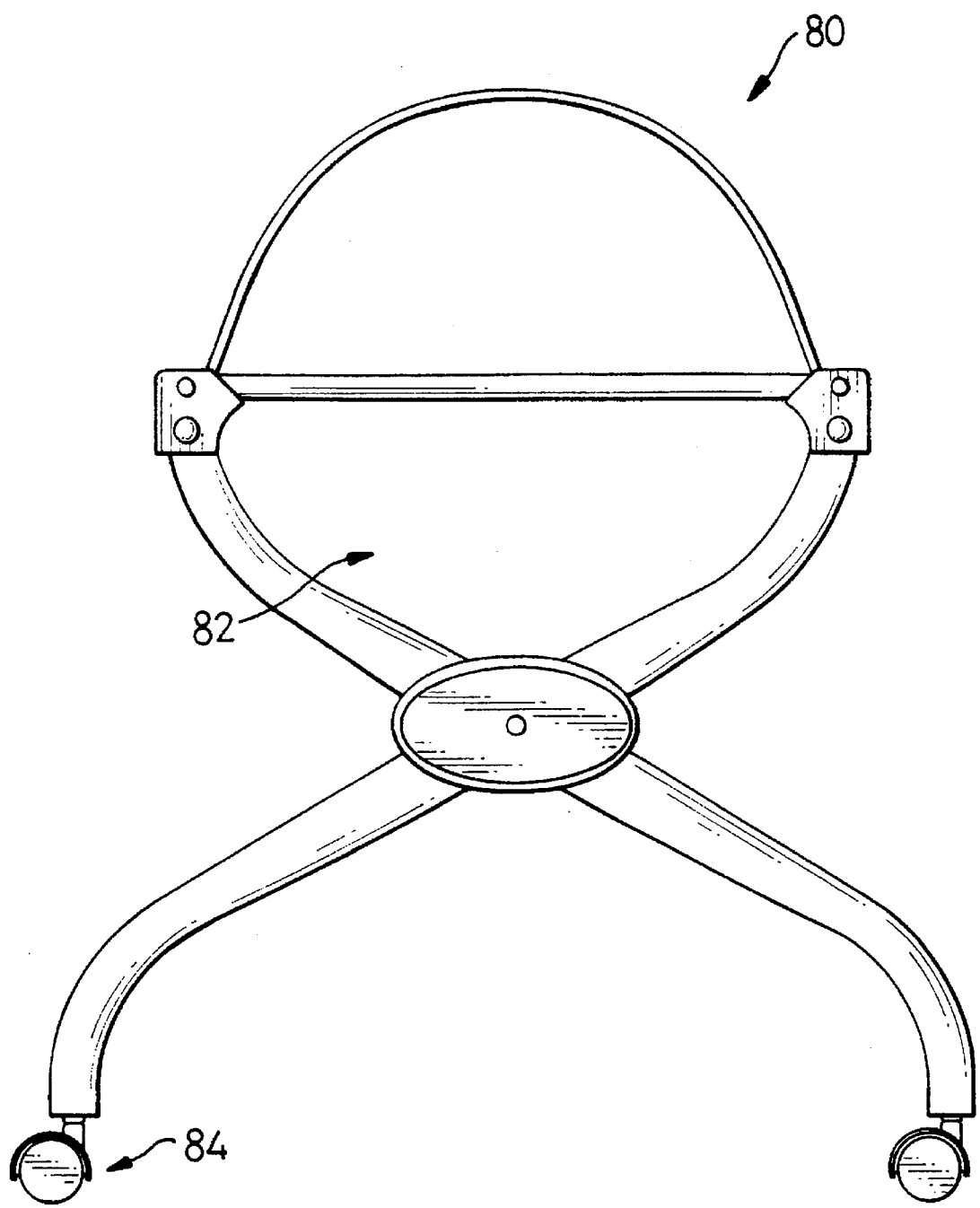
FIG. 9 is a front plan view of a conventional baby carriage in accordance with the prior art.

For a better understanding of the present invention, reference is made to FIG. 9, illustrating a conventional baby carriage 80. The baby carriage 80 has a receiving chamber 82 for supporting and laying babies therein and includes wheel modules 84 for moving the baby carriage 80. However, the wheel modules 84 cannot not be folded, thereby greatly limiting the availability of the baby carriage.

Figure 1:
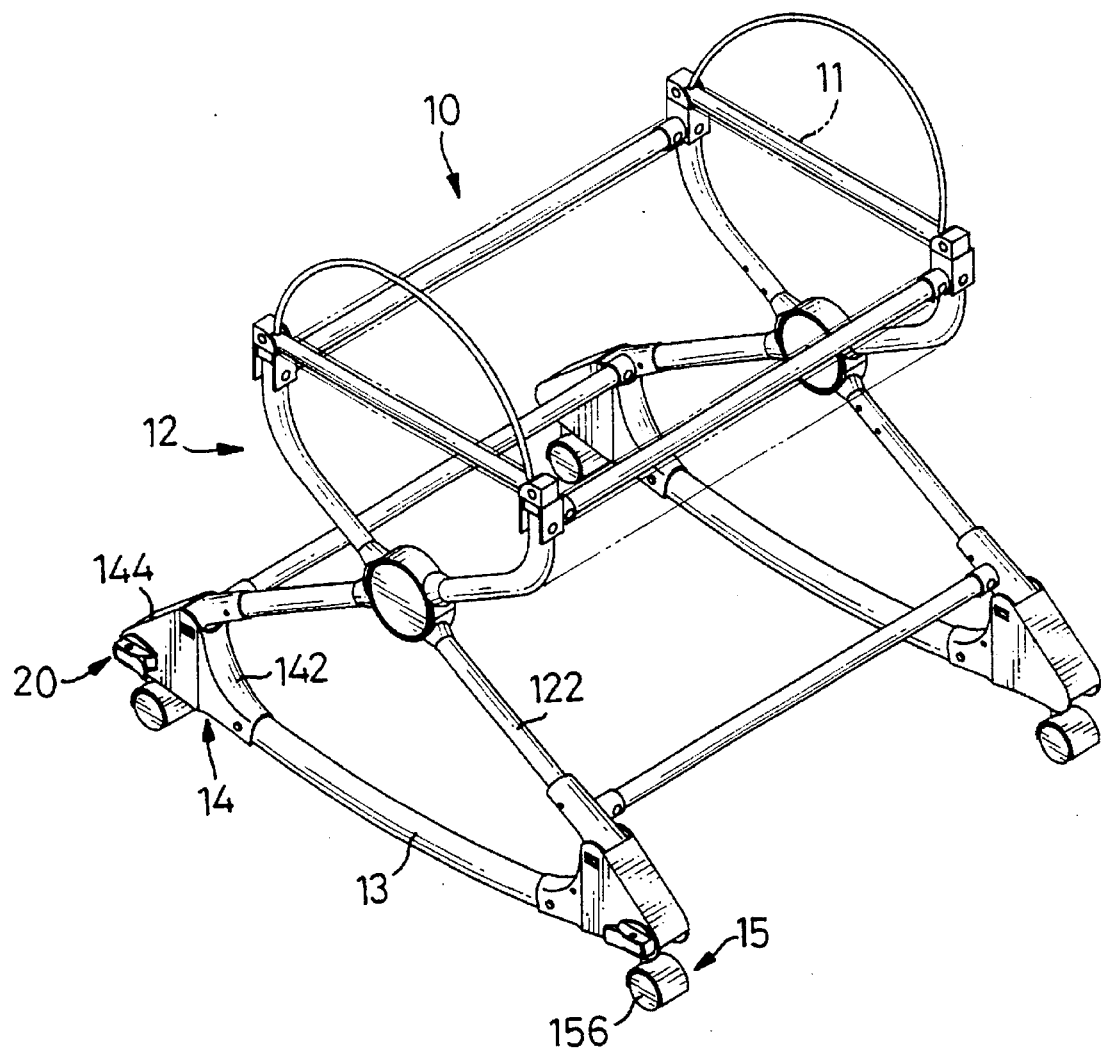
FIG. 1 is a perspective view of a baby rocking carriage in accordance with the present invention.
Figure 2:
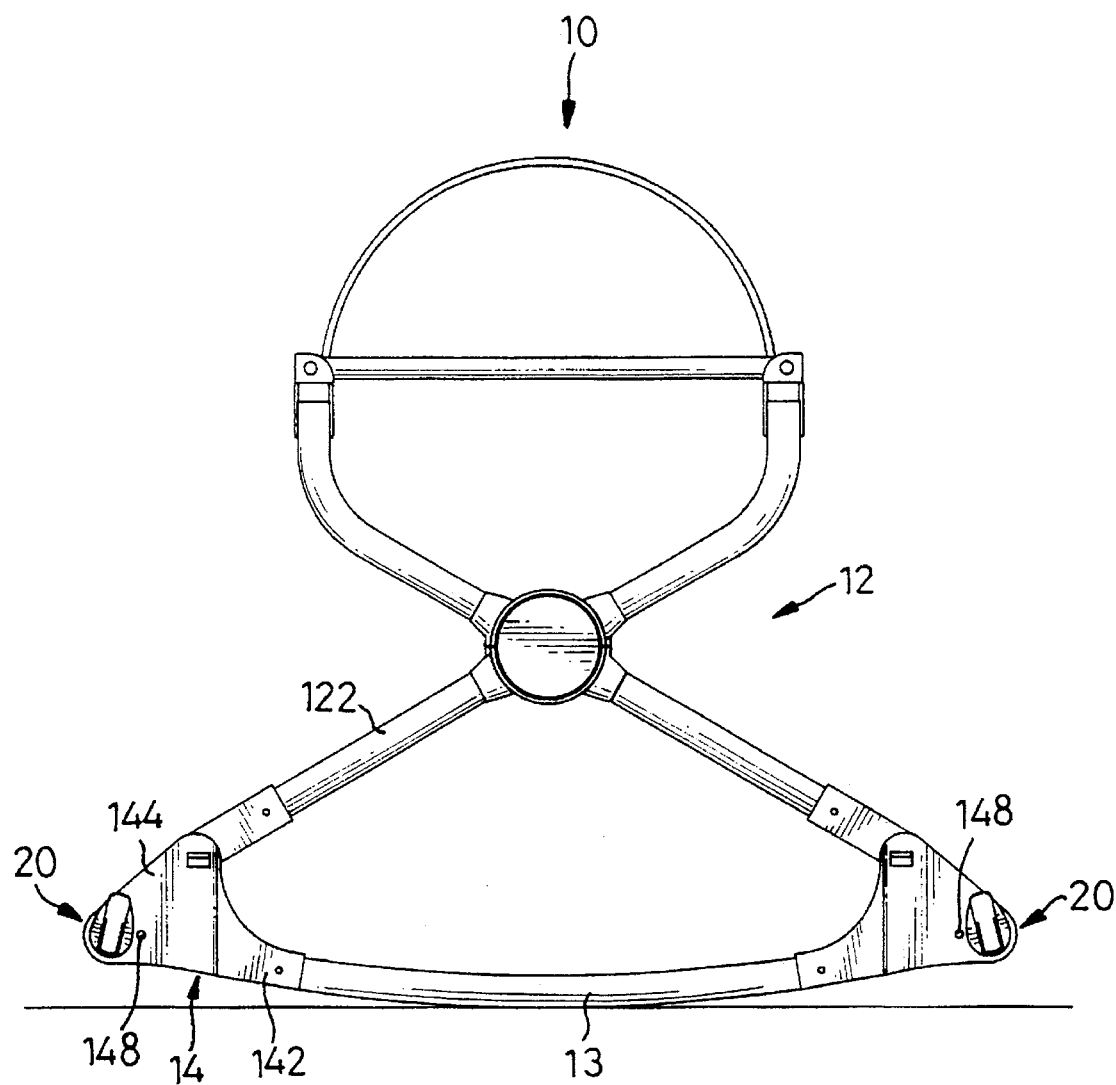
FIG. 2 is a front plan view of FIG. 1 showing the wheel module being disposed in a folded status.
Figure 3:
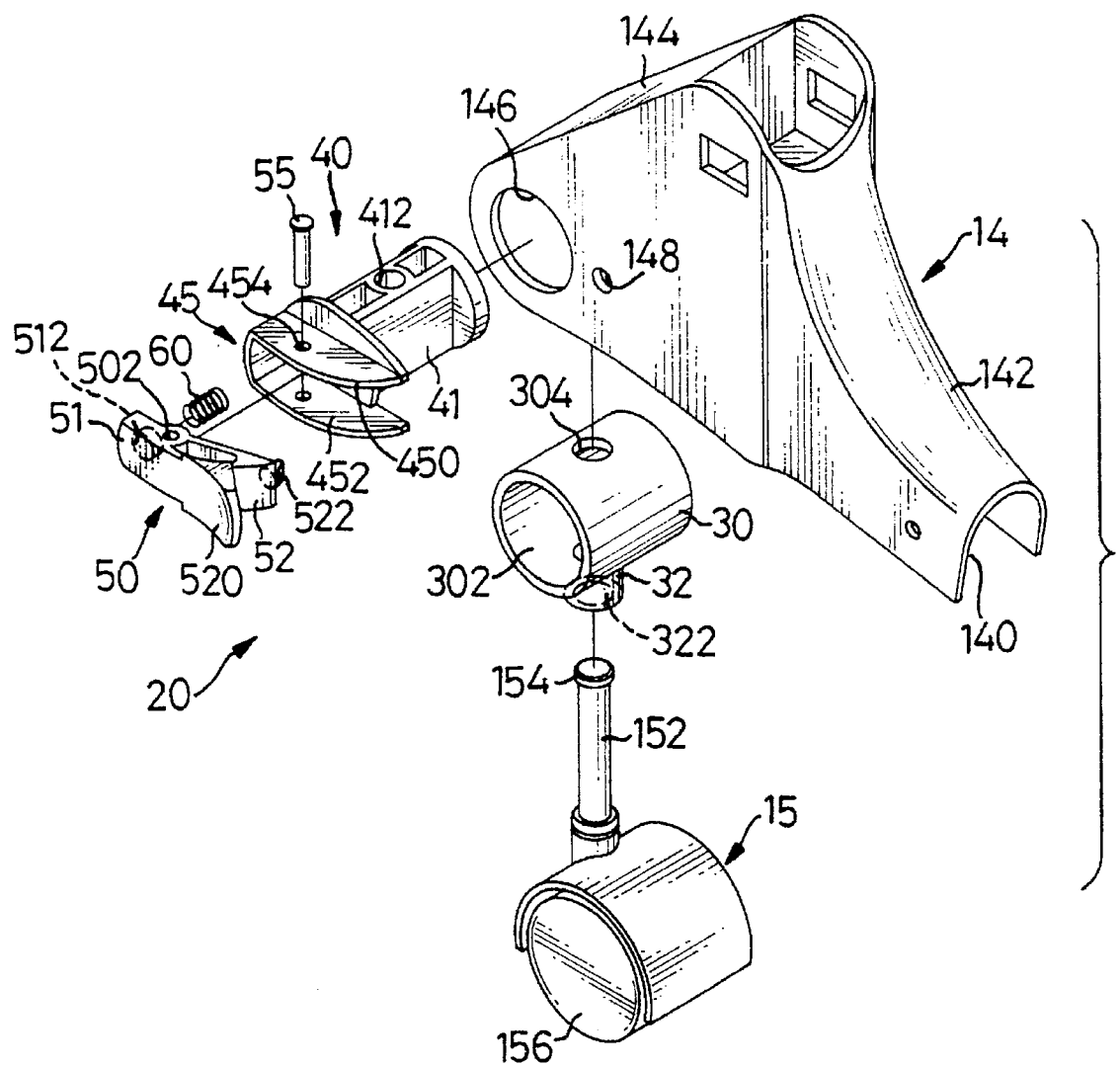
FIG. 3 is an exploded view of a mechanism for folding and expanding the baby rocking carriage.

Referring to the drawings, and initially to FIGS. 1–3, a mechanism 20 in accordance with the present invention is provided for folding and expanding wheel modules 15 of a baby rocking carriage 10.

The baby rocking carriage 10 essentially comprises two arcuate beams 13 arranged in parallel with each other and each having two distal ends, four base members 14 each having a first end portion 142 fixedly mounted on a corresponding distal end of each of the two arcuate beams 13 and a second end portion 144 having a passage 146 and a cavity 148 each transversely defined in an underside thereof and located adjacent to each other, four wheel modules 15 each pivotally disposed on an underside of a corresponding one of the four base members 14. Preferably, a channel 140 is defined in the underside of each of the four base members 14 and communicates with the passage 146.

In addition, a mounting frame 12 includes four legs 122 each fixedly fitted on an upper portion of a corresponding one of the four base members 14. Preferably, a covering layer 11 is surrounded around the mounting frame 12 for supporting and laying babies therein.

Referring to FIG. 3 with reference to FIGS. 1 and 2, the mechanism 20 comprises a sleeve 30 rotatably mounted in the passage 146 of the second end portion 144 of each of the four base members 14 and having a chamber 302 transversely defined therein. An extension 32 protrudes from an underside of the sleeve 30 and is pivotally engaged with each of the four wheel modules 15.

A control member 40 includes a plug 41 fixedly mounted in the chamber 302 of the sleeve 30 to rotate therewith and a lug 45 formed on the plug 41 and extending outwards of the sleeve 30, and an opening 452 transversely defined in the lug 45.

Preferably, the plug 41 of the control member 40 has a hole 412 vertically defined therein. A socket 322 is defined in the extension 32 of the sleeve 30 and aligns with the hole 412. A bore 304 is defined in the sleeve 30 and aligns with the hole 412.

Each of the four wheel modules 15 includes a roller 156 rotatably mounted on an underside thereof and an upright shaft 152 fixedly mounted thereon and extending through the socket 322 of the extension 32 and the hole 412 of the plug 41. The upright shaft 152 has an enlarged head 154 extending outwards of the hole 412 of the plug 41 and received in the bore 304 of the sleeve 30 such that the upright shaft 152 of the wheel module 15 is pivotally engaged with the sleeve 30 together with the plug 41. It is to be noted that the enlarged head 154 has a diameter greater than that of the hole 412. It is to be further noted that the control member 40 is made of a resilient material to prevmit the enlarged head 154 to extend therethrough.

A catch member 50 is pivotally mounted in the opening 452 of the lug 45 and includes a first end portion 51 having a space 512 transversely defined therein, a mediate portion, and a second end portion 52 releasably rested against a side wall of the second end portion 144 of each of the four base members 14. A boss 522 is laterally formed on and protrudes from the second end portion 52 of the catch member 50 and is detachably received in the cavity 148 of the second end portion 144 of each of the four base members 14.

A biasing member 60, preferably a spring, is mounted between the first end portion 51 of the catch member 50 and the lug 45 of the control member 40 and is received in the opening 452 of the lug 45 and has one distal end received in the space 512 of the first end portion 51 of the catch member 50.

Preferably, the lug 45 includes two flat plates 450 each having a bore 454 vertically defined therein and communicating with the opening 452. The catch member 50 has a hole 502 vertically defined in the mediate portion thereof and aligning with each of the two bores 454. A positioning pin 55 extends through each of the two bores 454 and the hole 502 such that the catch member 50 is pivotally mounted in the lug 45. The catch member 50 preferably has a handle 520 formed on the second end portion 52 thereof.

Figure 4:
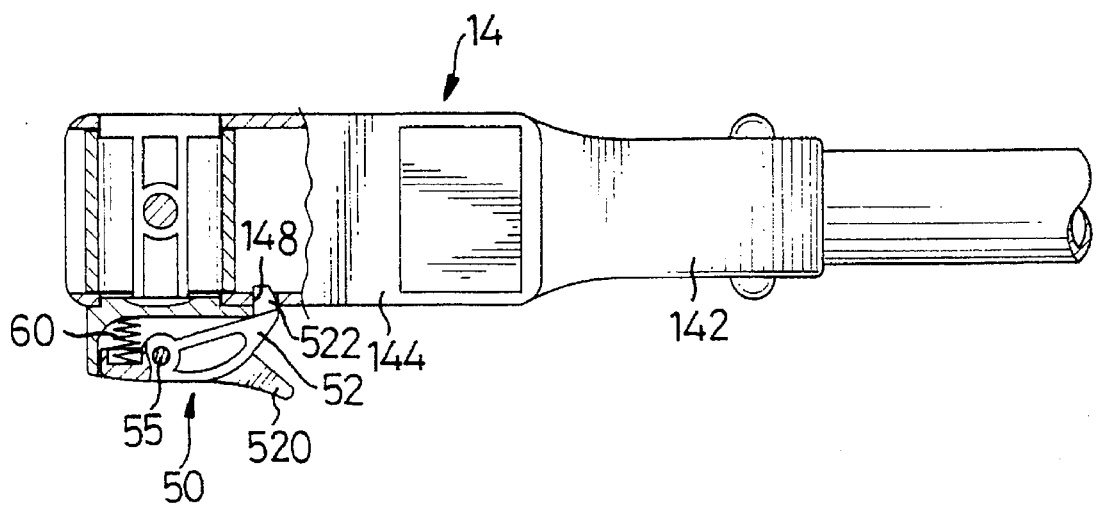
FIG. 4 is a top plan cross-sectional view of FIG. 3.
Figure 5:
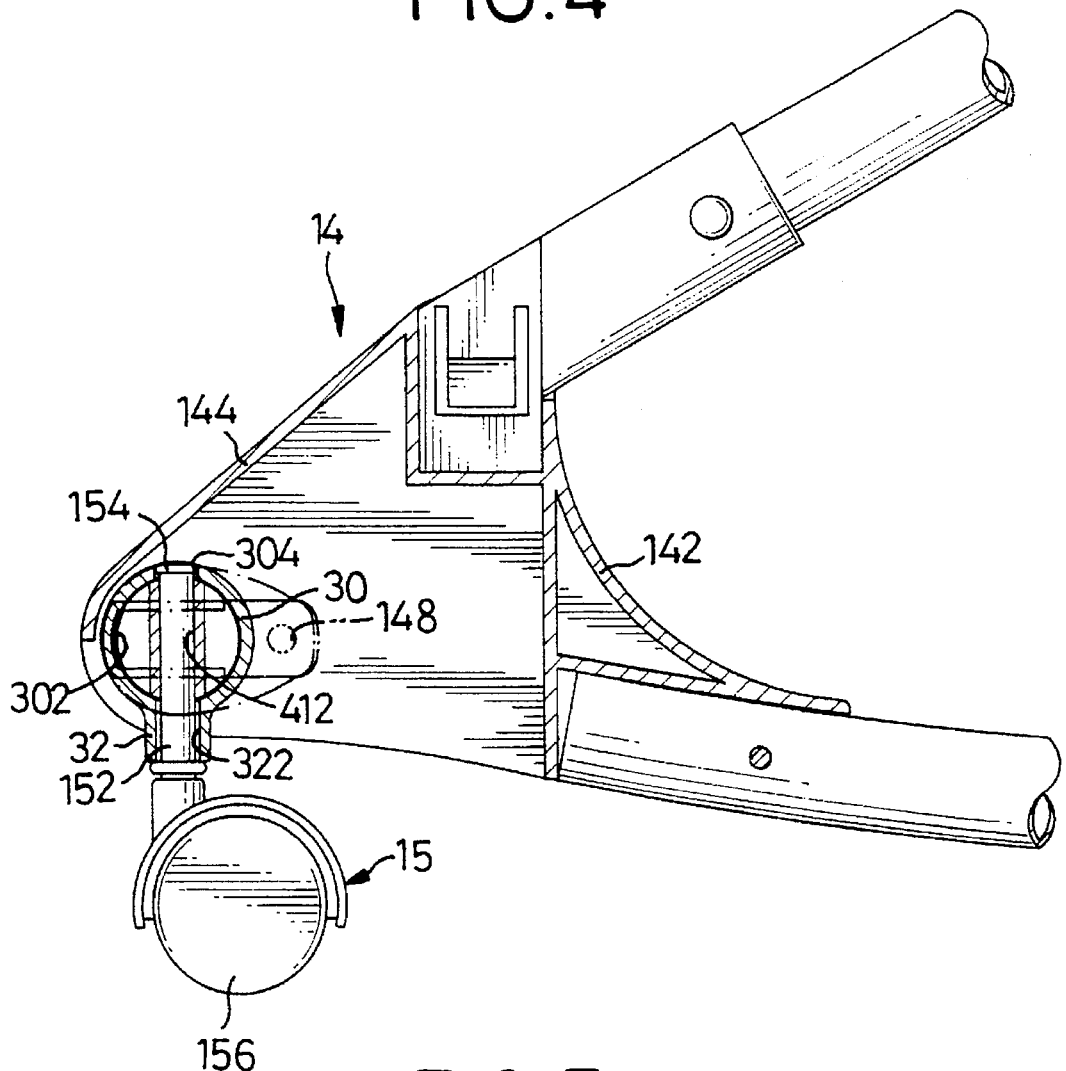
FIG. 5 is a front plan view of FIG. 3.

In operation, referring to FIGS. 4–7 with reference to FIG. 3, the boss 522 of the catch member 50 is initially received and stopped in the cavity 148 of the base member 14 as shown in FIG. 4 such that the control member 40 together with the sleeve 30 is positioned by the boss 522 of the catch member 50, thereby retaining extended the wheel module 15 in position as shown in FIG. 5.

Figure 6:
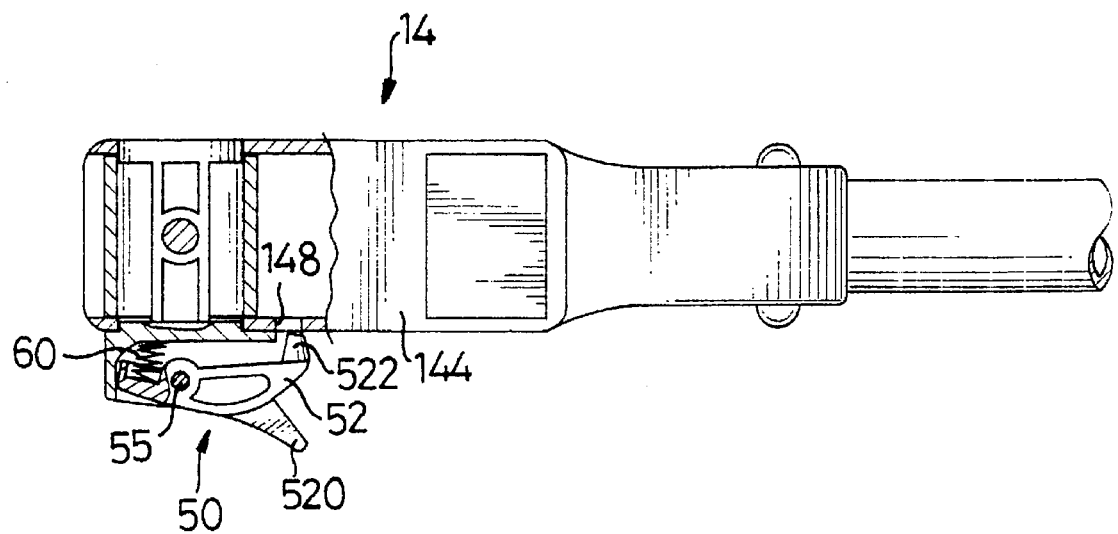
FIG. 6 is an operational view of FIG. 4.
Figure 7:
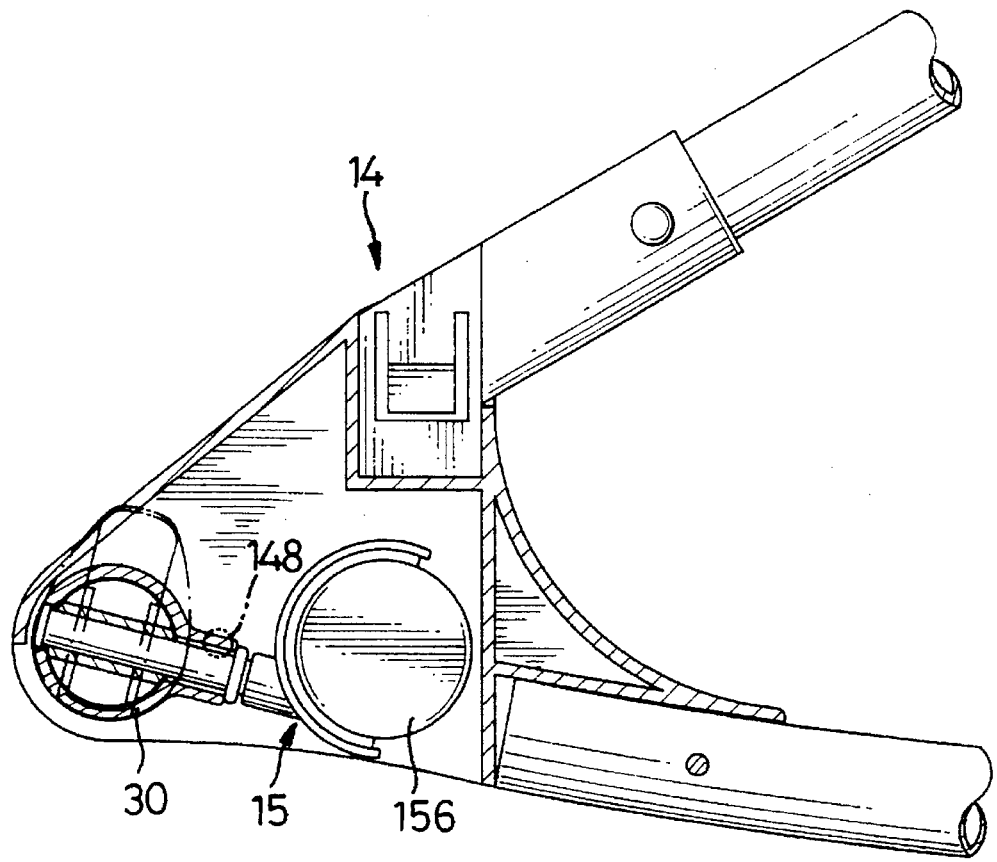
FIG. 7 is an operational view of FIG. 5.

The handle 520 of the catch member 50 can be forced to displace outwardly relative to the base member 14, thereby detaching the boss 522 from the cavity 148 of the base member as shown in FIG. 6 such that the control member 40 together with the sleeve 30 can be rotated in the passage 146 of the base member 14 and such that the upright shaft 152 of the wheel module 15 can be rotated relative to the base member 14, thereby folding the wheel module 15 in the channel 140 of the base member 14 as shown in FIG. 7.

Figure 8:
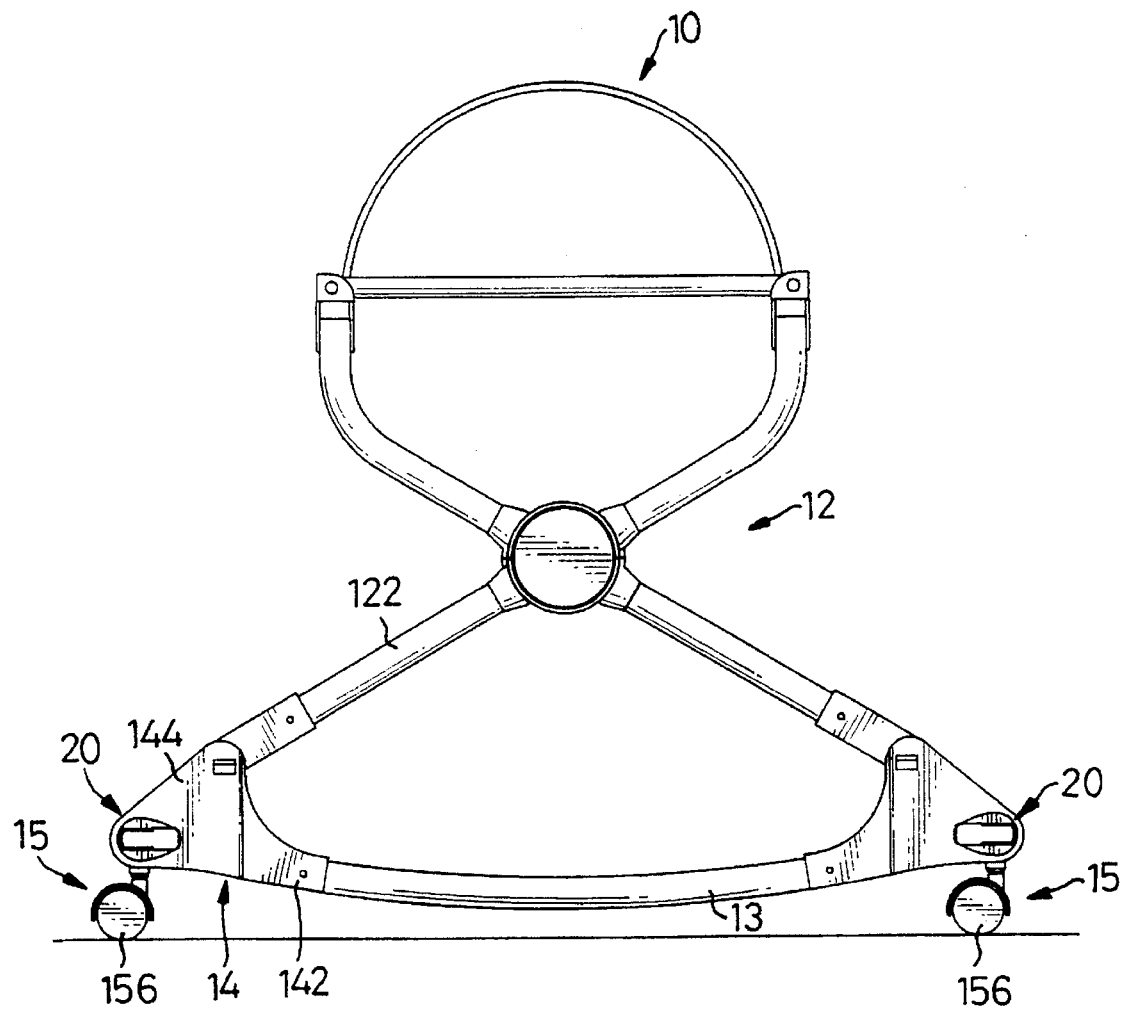
FIG. 8 is a front plan view of FIG. 1 showing the wheel module being disposed in an expanded status.

In comparison with FIGS. 2 and 8, FIG. 2 shows the wheel modules 15 being disposed in a folded status and FIG. 8 shows the wheel modules 15 being disposed in an expanded status.

Accordingly, by such an arrangement, the baby rocking carriage is suitable for dual functions, that is, the baby rocking carriage can be adapted to move on the floor when the wheel modules are fully expanded, and can be adapted to rock on the ground when the wheel modules are folded in the base members. In addition, the wheel modules are easily expanded and folded. Further, the mechanism can provide an excellent positioning effect on the wheel modules.

It should be clear to those skilled in the art that further embodiments of the present invention may be made without departing from the scope and spirit of the present invention.

What is claimed is:

1. A mechanism (20) for extending and retracting wheels on a baby rocking carriage (10), said baby rocking carriage (10) comprising two arcuate beams (13) arranged in parallel with each other and each having two distal ends, four base members (14) each having a first end portion (142) fixedly mounted on a corresponding distal end of each of said two arcuate beams (13) and a second end portion (144) having a passage (146) and a cavity (148) each transversely defined in an underside thereof and located adjacent to each other, and four wheel modules (15) each pivotally disposed on an underside of a corresponding one of the four base members (14), said mechanism (20) comprising:

a sleeve (30) rotatably mounted in said passage (146) of the second end portion (144) of each of said four base members (14) and having a chamber (302) transversely defined therein, an extension (32) protruding from an underside of said sleeve (30) for pivotally receiving each of said four wheel modules (15);

a control member (40) having a plug (41) fixedly mounted in said chamber (302) of said sleeve (30) to rotate therewith and a lug (45) formed on said plug (41) and extending outwards of said sleeve (30), an opening (452) transversely defined in said lug (45);

a catch member (50) pivotally mounted in said opening (452) of said lug (45) and including a first end portion (51) having a space (512) transversely defined therein, an intermediate portion, and a second end portion (52) releasably rested against the second end portion (144) of each of said four base members (14), a boss (522) laterally formed on and protruding from the second end portion (52) of said catch member (50) and detachably received in said cavity (148) of each of said four base members (14); and a biasing member (60) mounted between the first end portion (51) of said catch member (50) and said lug (45) of said control member (40) and having one distal end received in said space (512), said catch member securing said wheel module when rotated to a retracted position within said base member.

2. The mechanism in accordance with claim 1, wherein said lug (45) includes two flat plates (450) each having a bore (454) vertically defined therein and communicating with said opening (452), said catch member (50) having a hole (502) vertically defined in the intermediate portion thereof and aligned with each of said two bores (454), a positioning pin (55) extending through each of said two bores (454) and said hole (502) such that said catch member (50) is pivotally mounted in said lug (45).

3. The mechanism in accordance with claim 1, wherein said plug (41) of said control member (40) has a hole (412) vertically defined therein, a socket (322) defined in said extension (32) of said sleeve (30) and aligning with said hole (412), a bore (304) defined in said sleeve (30) and aligned with said hole (412), said wheel module (15) including an upright shaft (152) extending through said socket (322) and said hole (412), and including an enlarged head (154) extending outwards of said hole (412) and received in said bore (304) such that said upright shaft (152) of said wheel module (15) is pivotally received within said sleeve (30) and said plug (41).

* * * * *